United States Patent
Liu et al.

(10) Patent No.: US 11,160,066 B2
(45) Date of Patent: Oct. 26, 2021

(54) DATA RECEIVING METHOD AND DEVICE AND DATA TRANSMITTING METHOD AND DEVICE

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yang Liu, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 16/768,816

(22) PCT Filed: Dec. 20, 2017

(86) PCT No.: PCT/CN2017/117576
§ 371 (c)(1),
(2) Date: Jun. 1, 2020

(87) PCT Pub. No.: WO2019/119321
PCT Pub. Date: Jun. 27, 2019

(65) Prior Publication Data
US 2021/0176737 A1 Jun. 10, 2021

(51) Int. Cl.
*H04W 72/04* (2009.01)
*H04L 1/00* (2006.01)

(52) U.S. Cl.
CPC ......... *H04W 72/042* (2013.01); *H04L 1/0038* (2013.01); *H04W 72/0446* (2013.01)

(58) Field of Classification Search
CPC ............ H04W 72/042; H04W 72/0446; H04L 1/0038
See application file for complete search history.

(56) References Cited

U.S. PATENT DOCUMENTS

| 2015/0036653 A1 | 2/2015 | Kim et al. |
| 2016/0309542 A1 | 10/2016 | Kowalski et al. |

(Continued)

FOREIGN PATENT DOCUMENTS

| CN | 105790890 A | 7/2016 |
| CN | 106301719 A | 1/2017 |

(Continued)

OTHER PUBLICATIONS

Qualcomm Inc. "R4-1700509: Performance Requirements for MUST", 3GPP TSG-RAN WG4 #82, Feb. 17, 2017 (Feb. 17, 2017), entire document.

(Continued)

*Primary Examiner* — Ronald B Abelson
(74) *Attorney, Agent, or Firm* — Syncoda LLC; Feng Ma

(57) ABSTRACT

A data receiving method includes: receiving first downlink control information; receiving first data in a subframe subsequent to a subframe corresponding to the first downlink control information; if second downlink control information is not received, storing the first data located between a current subframe and the subframe corresponding to the first downlink control information; if the second downlink control information is received, acquiring demodulation auxiliary information; receiving data overlapping in time domain and frequency domain in a subframe subsequent to a subframe corresponding to the second downlink control infor- (Continued)

mation, the overlapping data comprising second data and third data; demodulating the stored first data according to the demodulation auxiliary information to obtain demodulated data corresponding to second user equipment; determining the third data in the overlapping data according to the demodulated data corresponding to the second user equipment; and acquiring the second data from the overlapping data according to the third data.

20 Claims, 14 Drawing Sheets

(56) References Cited

U.S. PATENT DOCUMENTS

| | | | |
|---|---|---|---|
| 2016/0374060 A1* | 12/2016 | Lim | H04W 72/04 |
| 2017/0041906 A1 | 2/2017 | Tsai et al. | |
| 2018/0027535 A1 | 1/2018 | Guo et al. | |
| 2018/0123759 A1 | 5/2018 | Zhang et al. | |
| 2018/0213591 A1 | 7/2018 | Kowalski et al. | |

FOREIGN PATENT DOCUMENTS

| | | |
|---|---|---|
| CN | 106656421 A | 5/2017 |
| CN | 107371254 A | 11/2017 |
| EP | 3270647 A1 | 1/2018 |
| WO | 2016154991 A1 | 10/2016 |
| WO | 2016208959 A1 | 12/2016 |
| WO | 2017020846 A1 | 2/2017 |

OTHER PUBLICATIONS

International Search Report in the international application No. PCT/CN2017/117576, dated Sep. 13, 2018.

English translation of the Written Opinion of the International Search Authority in the international application No. PCT/CN2017/117576, dated Sep. 13, 2018.

Supplementary European Search Report in the European application No. 17935081.4, dated Jun. 21, 2021.

Office Action of the Indian application No. 202047030327, dated Jul. 13, 2021.

* cited by examiner

First DCI, first data in a sub-frame after a sub-frame corresponding to the first DCI, second DCI corresponding to first UE, and superposed data, which are data superposed in time domain and frequency domain, in a sub-frame after a sub-frame corresponding to the second DCI are sent to the first UE — S61

FIG. 6

First DCI may be sent to first UE through first control signaling. The first control signaling may include but the first DCI. First data in a sub-frame after a sub-frame of the first DCI, second DCI of the first UE, and superposed data, which are data superposed in time domain and frequency domain, in a sub-frame after a sub-frame corresponding to the second DCI are sent to the first UE

First DCI may be sent to first UE through second control signaling. The second control signaling may include the first DCI and other control information. First data in a sub-frame after a sub-frame of the first DCI, second DCI of the first UE, and superposed data, which are data superposed in time domain and frequency domain, in a sub-frame after a sub-frame corresponding to the second DCI are sent to the first UE — S612

FIG. 8

DATA RECEIVING METHOD AND DEVICE AND DATA TRANSMITTING METHOD AND DEVICE

CROSS-REFERENCE TO RELATED APPLICATIONS

The present application is a national stage of International Application No. PCT/CN2017/117576 filed on Dec. 20, 2017, the disclosure of which is hereby incorporated by reference in its entirety.

TECHNICAL FIELD

The subject disclosure relates to the field of communication, and more particularly, to a method for receiving data, a method for sending data, a device for receiving data, a device for sending data, electronic equipment, and a computer-readable storage medium.

BACKGROUND

In related art, a base station may transmit data to nearby User Equipment (UE) and remote UE using Multiuser Superposition Transmission (MUST), to promote efficiency in utilizing frequency domain and time domain. That is, a base station may send data corresponding to nearby UE and data corresponding to remote UE as superposed data on the same resource(s) in time domain and frequency domain. Nearby UE may acquire data corresponding to remote UE by demodulating superposed data. Then, the nearby UE may acquire data corresponding to the nearby UE by removing the data corresponding to the remote UE from the superposed data.

However, in related art, nearby UE may start to demodulate superposed data only after receiving Downlink Control Information (DCI) for the nearby UE sent by a base station. To ensure accuracy of demodulation, UE may have to receive superposed data for a number of times, which means that the UE may have to spend an increased amount of time acquiring data corresponding to remote UE, leading to a major delay in acquiring, by the nearby UE, data corresponding to the nearby UE.

SUMMARY

In view of this, the subject disclosure provides a method for receiving data, a method for sending data, a device for receiving data, a device for sending data, electronic equipment, and a computer-readable storage medium, capable of solving a problem in related art.

According to a first aspect of embodiments of the subject disclosure, a method for receiving data may apply to first User Equipment (UE). The method includes:

receiving first Downlink Control Information (DCI) sent by a base station;

receiving first data in a sub-frame after a sub-frame corresponding to the first DCI, the first data being modulated data corresponding to second UE in any sub-frame between the sub-frame corresponding to the first DCI and a sub-frame corresponding to second DCI corresponding to the first UE, a distance between the second UE and the base station being greater than a distance between the first UE and the base station;

in response to determining that the second DCI is not received, storing the first data between a current sub-frame and the sub-frame corresponding to the first DCI, the current sub-frame being a sub-frame when it is determined whether the second DCI is received;

in response to determining that the second DCI is received, acquiring demodulation assisting information from the second DCI;

receiving superposed data, which are data superposed in time domain and frequency domain, in a sub-frame after the sub-frame corresponding to the second DCI, the superposed data including second data and third data, the second data being modulated data corresponding to the first UE, the third data being modulated data corresponding to the second UE after the sub-frame corresponding to the second DCI;

acquiring demodulated data corresponding to the second UE by demodulating, according to the demodulation assisting information, the first data stored;

determining the third data in the superposed data according to the demodulated data corresponding to the second UE; and acquiring the second data from the superposed data according to the third data.

Optionally, receiving the first DCI sent by the base station may include:

detecting the first DCI by performing blind detection on data received from the base station according to a Cell Radio Network Temporary Identifier (C-RNTI).

Optionally, determining whether the second DCI is received may include:

detecting the second DCI by performing blind detection on data received from the base station according to a Cell Radio Network Temporary Identifier (C-RNTI); in response to determining that the second DCI is detected, determining that the second DCI is received; in response to determining that the second DCI is not detected, determining that the second DCI is not received.

Optionally, storing the first data between the current sub-frame and the sub-frame corresponding to the first DCI may include:

storing the first data between the current sub-frame and a sub-frame spaced from the current sub-frame by a preset time window.

According to a second aspect of embodiments of the subject disclosure, a method for sending data may include:

sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and the base station is greater than a distance between the first UE and the base station.

Optionally, sending the first DCI to the first UE may include sending the first DCI to the first UE through first control signaling.

The first control signaling may include but the first DCI.

Optionally, sending the first DCI to the first UE may include sending the first DCI to the first UE through second control signaling.

The second control signaling may include the first DCI and other control information.

According to a third aspect of embodiments of the subject disclosure, a device for receiving data may apply to first User Equipment (UE). The device includes a first receiving module, a second receiving module, a storing module, a demodulation acquiring module, a third receiving module, a demodulating module, a determining module, and a data acquiring module.

The first receiving module is adapted to receiving first Downlink Control Information (DCI) sent by a base station.

The second receiving module is adapted to receiving first data in a sub-frame after a sub-frame corresponding to the first DCI. The first data are modulated data corresponding to second UE in any sub-frame between the sub-frame corresponding to the first DCI and a sub-frame corresponding to second DCI corresponding to the first UE. A distance between the second UE and the base station is greater than a distance between the first UE and the base station.

The storing module is adapted to, in response to determining that the second DCI is not received, storing the first data between a current sub-frame and the sub-frame corresponding to the first DCI. The current sub-frame is a sub-frame when it is determined whether the second DCI is received.

The demodulation acquiring module is adapted to, in response to determining that the second DCI is received, acquiring demodulation assisting information from the second DCI.

The third receiving module is adapted to receiving superposed data, which are data superposed in time domain and frequency domain, in a sub-frame after the sub-frame corresponding to the second DCI. The superposed data include second data and third data. The second data are modulated data corresponding to the first UE. The third data are modulated data corresponding to the second UE after the sub-frame corresponding to the second DCI.

The demodulating module is adapted to acquiring demodulated data corresponding to the second UE by demodulating, according to the demodulation assisting information, the first data stored.

The determining module is adapted to determining the third data in the superposed data according to the demodulated data corresponding to the second UE.

The data acquiring module is adapted to acquiring the second data from the superposed data according to the third data.

Optionally, the first receiving module may include a blind detection sub-module. The blind detection sub-module may be adapted to detecting the first DCI by performing blind detection on data received from the base station according to a Cell Radio Network Temporary Identifier (C-RNTI).

Optionally, the device may further include a blind detection module.

The blind detection module may be adapted to: detecting the second DCI by performing blind detection on data received from the base station according to a Cell Radio Network Temporary Identifier (C-RNTI); in response to determining that the second DCI is detected, determining that the second DCI is received; in response to determining that the second DCI is not detected, determining that the second DCI is not received.

Optionally, the storing module may be adapted to storing the first data between the current sub-frame and a sub-frame spaced from the current sub-frame by a preset time window.

According to a fourth aspect of embodiments of the subject disclosure, a device for sending data includes a sending module.

The sending module is adapted to sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and the base station is greater than a distance between the first UE and the base station.

Optionally, the sending module may be adapted to sending the first DCI to the first UE through first control signaling. The first control signaling may include but the first DCI.

Optionally, the sending module may be adapted to sending the first DCI to the first UE through second control signaling. The second control signaling may include the first DCI and other control information.

According to a fifth aspect of embodiments of the subject disclosure, electronic equipment may apply to first User Equipment (UE). The electronic equipment includes a processor and memory.

The memory is adapted to storing an instruction executable by the processor.

The processor is adapted to:

receiving first Downlink Control Information (DCI) sent by a base station;

receiving first data in a sub-frame after a sub-frame corresponding to the first DCI, the first data being modulated data corresponding to second UE in any sub-frame between the sub-frame corresponding to the first DCI and a sub-frame corresponding to second DCI corresponding to the first UE, a distance between the second UE and the base station being greater than a distance between the first UE and the base station;

in response to determining that the second DCI is not received, storing the first data between a current sub-frame and the sub-frame corresponding to the first DCI, the current sub-frame being a sub-frame when it is determined whether the second DCI is received;

in response to determining that the second DCI is received, acquiring demodulation assisting information from the second DCI;

receiving superposed data, which are data superposed in time domain and frequency domain, in a sub-frame after the sub-frame corresponding to the second DCI, the superposed data including second data and third data, the second data being modulated data corresponding to the first UE, the third data being modulated data corresponding to the second UE after the sub-frame corresponding to the second DCI;

acquiring demodulated data corresponding to the second UE by demodulating, according to the demodulation assisting information, the first data stored;

determining the third data in the superposed data according to the demodulated data corresponding to the second UE; and acquiring the second data from the superposed data according to the third data.

According to a sixth aspect of embodiments of the subject disclosure, a computer-readable storage medium has stored thereon a computer program applying to first User Equipment (UE). When executed by a processor, the computer program causes the processor to implement:

receiving first Downlink Control Information (DCI) sent by a base station;

receiving first data in a sub-frame after a sub-frame corresponding to the first DCI, the first data being modulated data corresponding to second UE in any sub-frame between the sub-frame corresponding to the first DCI and a sub-frame corresponding to second DCI corresponding to the first UE, a distance between the second UE and the base station being greater than a distance between the first UE and the base station;

in response to determining that the second DCI is not received, storing the first data between a current sub-frame and the sub-frame corresponding to the first DCI, the current sub-frame being a sub-frame when it is determined whether the second DCI is received;

in response to determining that the second DCI is received, acquiring demodulation assisting information from the second DCI;

receiving superposed data, which are data superposed in time domain and frequency domain, in a sub-frame after the sub-frame corresponding to the second DCI, the superposed data including second data and third data, the second data being modulated data corresponding to the first UE, the third data being modulated data corresponding to the second UE after the sub-frame corresponding to the second DCI;

acquiring demodulated data corresponding to the second UE by demodulating, according to the demodulation assisting information, the first data stored;

determining the third data in the superposed data according to the demodulated data corresponding to the second UE; and acquiring the second data from the superposed data according to the third data.

According to a seventh aspect of embodiments of the subject disclosure, electronic equipment includes a processor and memory.

The memory is adapted to storing an instruction executable by the processor.

The processor is adapted to:

sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and the base station is greater than a distance between the first UE and the base station.

According to an eighth aspect of embodiments of the subject disclosure, a computer-readable storage medium has stored thereon a computer program. When executed by a processor, the computer program causes the processor to implement: sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and the base station is greater than a distance between the first UE and the base station.

With embodiments of the subject disclosure, first UE may receive and store data corresponding to second UE before a sub-frame corresponding to second DCI. Accordingly, when the first UE has received superposed data of data corresponding to the first UE and the data corresponding to the second UE in time domain and frequency domain, the first UE may determine demodulated data corresponding to the second UE by demodulating stored data corresponding to the second UE. The first UE may determine modulated data corresponding to the second UE in superposed data according to the demodulated data corresponding to the second UE. Accordingly, the first UE may acquire the demodulated data corresponding to the second UE without having to first receive a large amount of superposed data after the sub-frame corresponding to the second DCI. Thus, the first UE may rapidly acquire the data corresponding to the first UE from the superposed data upon receiving the second DCI, greatly reducing a delay in acquiring, by the first UE, the data corresponding to the first UE from the superposed data.

BRIEF DESCRIPTION OF THE DRAWINGS

Drawings for describing embodiments herein are introduced below briefly for clearer illustration of a technical solution of embodiments herein. Note that the drawings described below refer merely to some embodiments herein. A person having ordinary skill in the art may acquire other drawings according to the drawings herein without creative effort.

FIG. 6 is a flowchart of a method for sending data according to an embodiment of the subject disclosure.

FIG. 7 is a flowchart of a method for sending data according to an embodiment of the subject disclosure.

FIG. 8 is a flowchart of a method for sending data according to an embodiment of the subject disclosure.

DETAILED DESCRIPTION

Clear complete description to a technical solution of embodiments of the subject disclosure is given below with reference to the drawings of embodiments of the subject disclosure. Clearly, embodiments illustrated herein are but some, instead of all, embodiments according to the subject disclosure. Based on the embodiments of the subject disclosure, a person having ordinary skill in the art may acquire another embodiment without creative effort. Any such embodiment falls within the scope of the subject disclosure.

Figure 1:
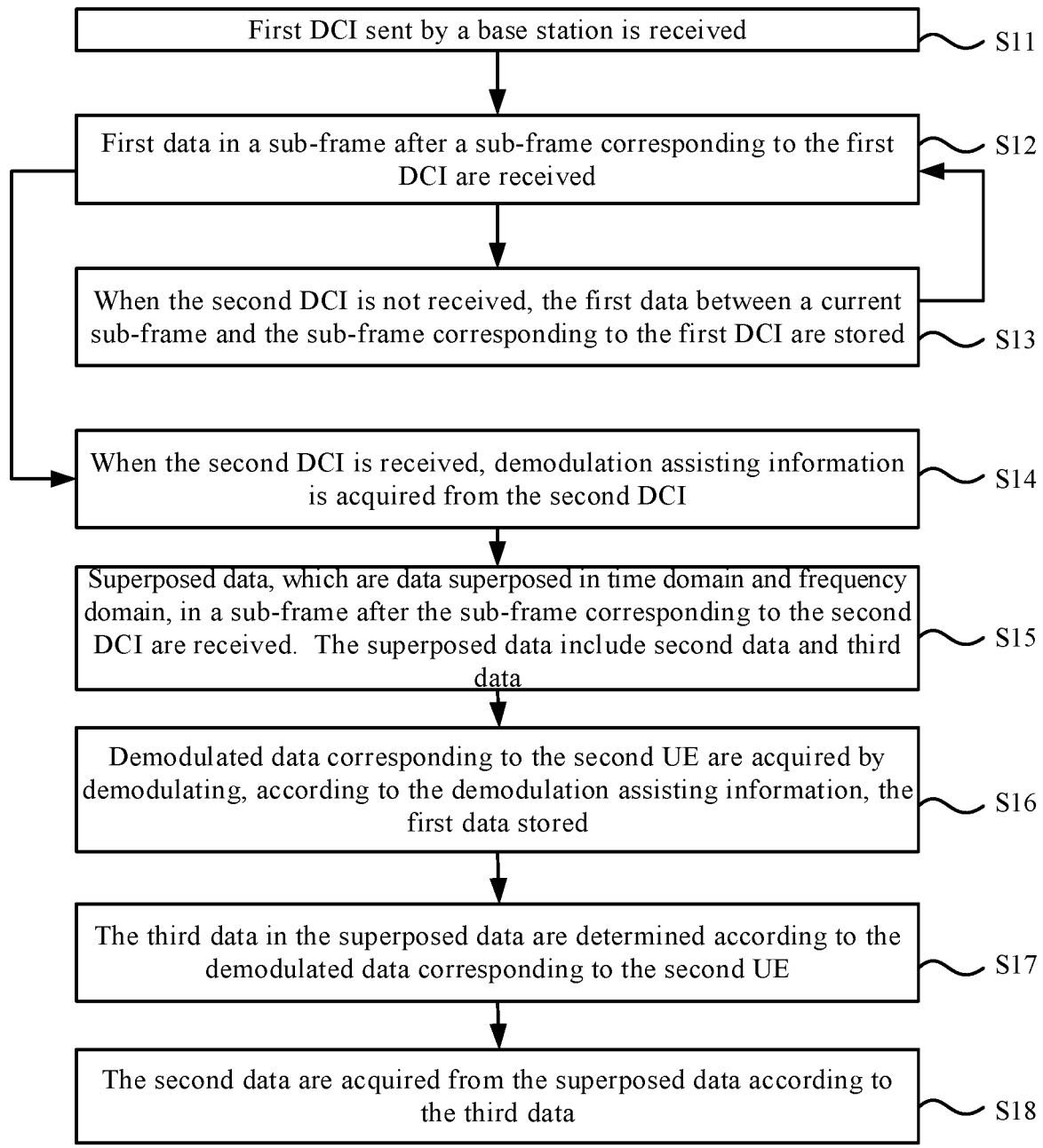
FIG. 1 is a flowchart of a method for receiving data according to an embodiment of the subject disclosure.

FIG. 1 is a flowchart of a method for receiving data according to an embodiment of the subject disclosure. The method of the embodiment may apply to first UE, such as a mobile phone, a tablet computer, etc. As shown in FIG. 1, the method includes steps as follows.

In S11, first Downlink Control Information (DCI) sent by a base station is received.

In S12, first data in a sub-frame after a sub-frame corresponding to the first DCI are received. The first data are modulated data corresponding to second UE in any sub-frame between the sub-frame corresponding to the first DCI and a sub-frame corresponding to second DCI corresponding to the first UE. A distance between the second UE and the base station is greater than a distance between the first UE and the base station.

Figure 2:
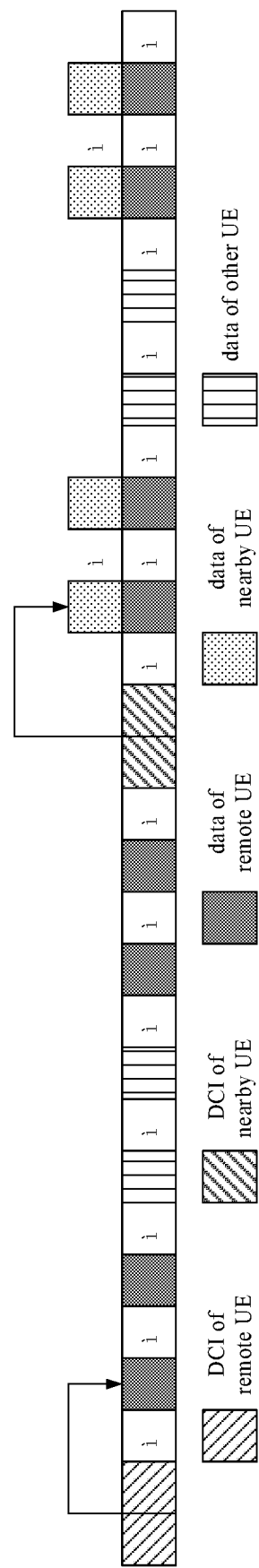
FIG. 2 is a diagram of distribution of data sent by a base station in time domain in related art.

FIG. 2 is a diagram of distribution of data sent by a base station in time domain in related art. As shown in FIG. 2, As shown in FIG. 2, DCI corresponding remote UE may indicate information on a sub-frame in time domain corresponding to data for a remote user, etc. DCI corresponding a nearby user may indicate information on a sub-frame in time domain corresponding to data for a nearby user, etc.

To ensure that UE may receive data, a base station may send the data to the UE repeatedly. Nearby UE may receive, from a base station, a signal of greater strength than strength of a signal received from the base station by remote UE. Accordingly, a number of times a base station repeats sending of data to nearby UE may be less than a number of times the base station repeats sending of data to remote UE.

For example, as shown in FIG. 2, a base station may repeat sending, after a sub-frame corresponding to DCI corresponding nearby UE, of data to the nearby UE a number of times same as that the base station repeats sending of data to remote UE. The base station may repeat sending, between a sub-frame corresponding to DCI corresponding remote UE and the sub-frame corresponding to the DCI corresponding the nearby UE, of the data to the remote UE without repeating sending of the data to the nearby UE. Note that a base station may send data corresponding to other UE in addition to data corresponding to nearby UE and data corresponding to remote UE.

A base station may send, by MUST, after a sub-frame corresponding to DCI corresponding nearby UE, data corresponding to the nearby UE and data corresponding to remote UE, as superposed data on identical resource(s) in time domain and frequency domain.

When receiving DCI corresponding nearby UE, the nearby UE may receive data corresponding to the nearby UE according to a location in time domain corresponding to the nearby UE as indicated by the DCI of the nearby UE. As data corresponding to nearby UE and data corresponding to remote UE are superposed in time domain, to acquire the data of the nearby UE, the nearby UE may have to receive multiple superposed data after a sub-frame corresponding to DCI corresponding to the nearby UE. The nearby UE may have to merge power of the multiple superposed data to acquire superposed data with sufficient power. Then, the nearby UE may acquire the data corresponding to the remote UE by decoding merged data according to demodulation assisting information through Successive Interference Cancellation (SIC). Then, the nearby UE may acquire the data corresponding to the nearby UE by acquiring data in the superposed data other than the data corresponding to the remote UE.

However, with a solution in related art, nearby UE may have to wait for a major amount of time before receiving sufficient amount of superposed data. Accordingly, a major amount of time may be required for nearby UE to acquire what required by the nearby UE, resulting in a major delay.

Figure 3:
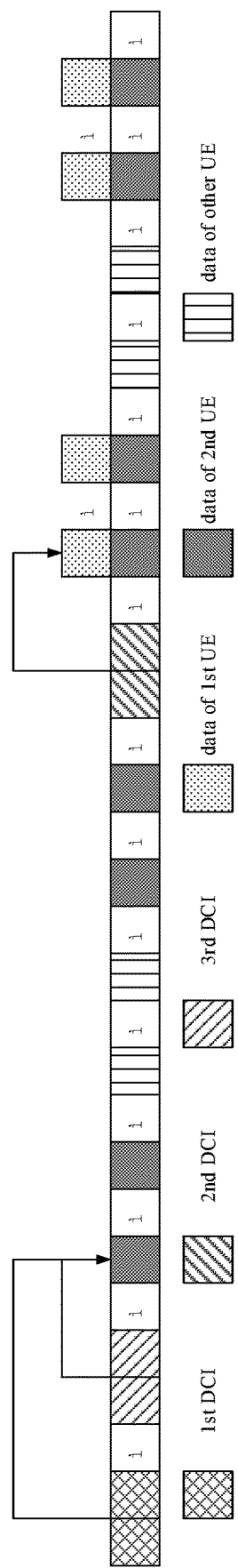
FIG. 3 is a diagram of distribution of data sent by a base station in time domain according to an embodiment of the subject disclosure.

FIG. 3 is a diagram of distribution of data sent by a base station in time domain according to an embodiment of the subject disclosure.

In an embodiment, as shown in FIG. 3, in addition to sending DCI and data in a solution shown in FIG. 2, a base station may also send first DCI. After receiving the first DCI, first UE may receive data corresponding to second UE in a sub-frame after a sub-frame corresponding to the first DCI according to information such as a sub-frame corresponding to data corresponding to the second UE in time domain, etc., as indicated by the first DCI, as well as a location in the time domain and a duration of a Downlink (DL) gap as indicated by a system message (such as a System Information Block, SIB).

In S13, when the second DCI is not received, the first data between a current sub-frame and the sub-frame corresponding to the first DCI are stored. The current sub-frame is a sub-frame when it is determined whether the second DCI is received.

In S14, when the second DCI is received, demodulation assisting information is acquired from the second DCI.

In an embodiment, when first UE has not received second DCI, the first UE may store data corresponding to the second UE that the first UE has received. That is, the first UE may store the first data between the current sub-frame and the sub-frame corresponding to the first DCI. When first UE has received second DCI, the first UE may acquire demodulation assisting information from the second DCI. Note that demodulation assisting information may be acquired from second DCI. Demodulation assisting information may be acquired from other information sent by a base station. Alternatively, demodulation assisting information may be pre-stored in second UE.

In S15, superposed data, which are data superposed in time domain and frequency domain, in a sub-frame after the sub-frame corresponding to the second DCI are received. The superposed data include second data and third data. The second data are modulated data corresponding to the first UE. The third data are modulated data corresponding to the second UE after the sub-frame corresponding to the second DCI.

In S16, demodulated data corresponding to the second UE are acquired by demodulating, according to the demodulation assisting information, the first data stored.

In an embodiment, having received second DCI, on one hand, first UE may receive, in a sub-frame after a sub-frame corresponding to the second DCI, superposed data of data corresponding to the first UE and data corresponding to second UE in time domain and frequency domain; and on the other hand, the first UE may demodulate stored data corresponding to the second UE according to the demodulation assisting information acquired. For example, the first UE may merge power of the stored data corresponding to second UE. Then, the first UE may acquire demodulated data corresponding to the second UE by demodulating merged data.

In S17, the third data in the superposed data are determined according to the demodulated data corresponding to the second UE.

In an embodiment, a base station may send same data corresponding to second UE before and after a sub-frame corresponding to second DCI. Accordingly, after demodulated data corresponding to the second UE are acquired, modulated data corresponding to the second UE in superposed data may be determined.

In S18, the second data are acquired from the superposed data according to the third data.

In an embodiment, having determined third data in superposed data, first UE may acquire data in the superposed data other than the third data, i.e., second data, i.e., modulated data corresponding to the first UE.

Compared to the solution shown in FIG. 2, first UE may receive and store data corresponding to second UE before a sub-frame corresponding to second DCI. Accordingly, when the first UE has received superposed data of data corresponding to the first UE and the data corresponding to the second UE in time domain and frequency domain, the first UE may determine demodulated data corresponding to the second UE by demodulating stored data corresponding to the second UE. The first UE may determine modulated data corresponding to the second UE in superposed data according to the demodulated data corresponding to the second UE. Accordingly, the first UE may acquire the demodulated data corresponding to the second UE without having to first receive a large amount of superposed data after the sub-frame corresponding to the second DCI. Thus, the first UE may rapidly acquire the data corresponding to the first UE from the superposed data upon receiving the second DCI, greatly reducing a delay in acquiring, by the first UE, the data corresponding to the first UE from the superposed data.

Figure 4:
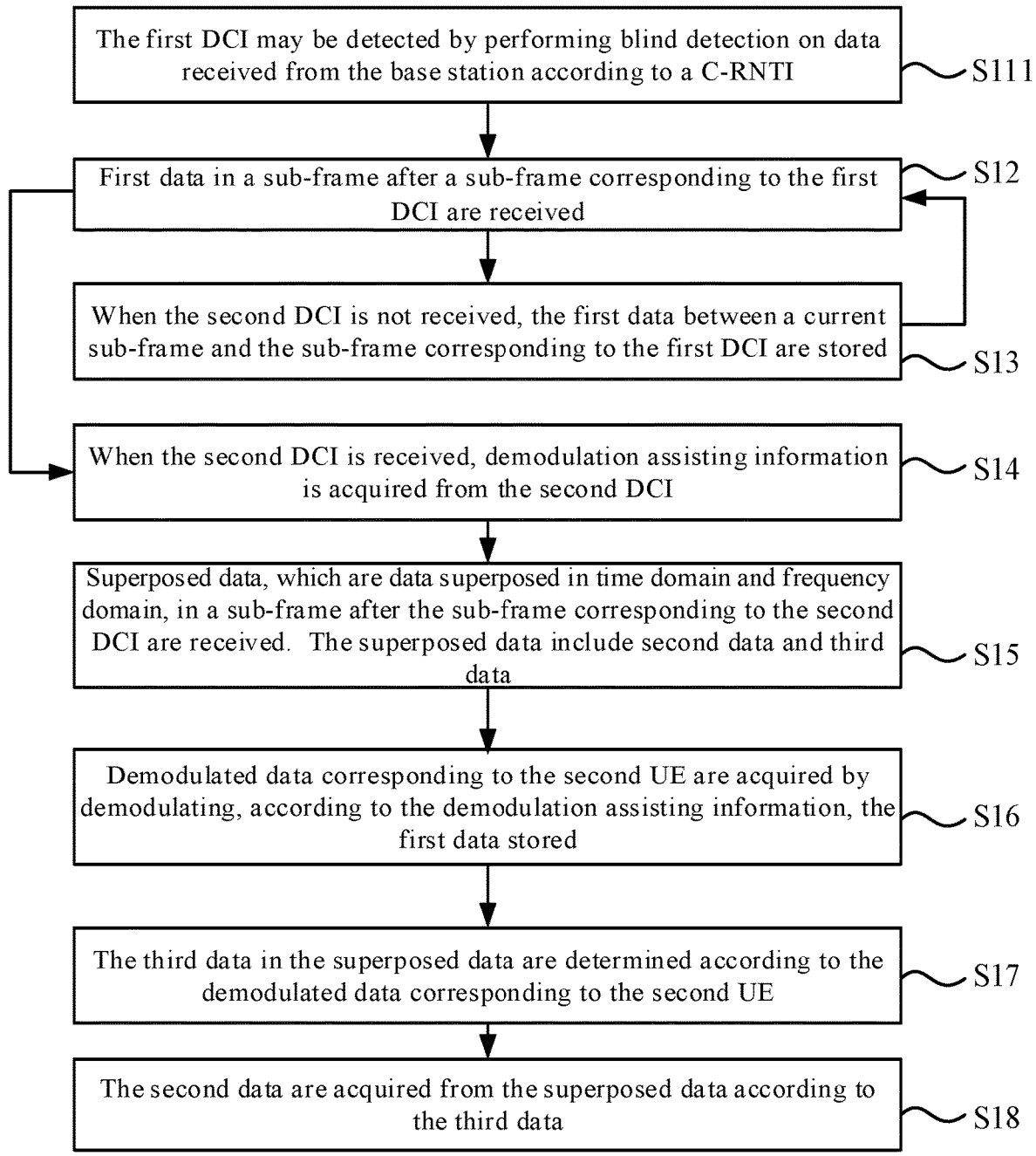
FIG. 4 is a flowchart of a method for receiving data according to an embodiment of the subject disclosure.

FIG. 4 is a flowchart of a method for receiving data according to an embodiment of the subject disclosure. As shown in FIG. 4, based on the embodiment shown in FIG. 1, the first UE may receive the first DCI sent by the base station as follows.

In S111, the first DCI may be detected by performing blind detection on data received from the base station according to a Cell Radio Network Temporary Identifier (C-RNTI).

Optionally, it may be determined whether the second DCI is received as follows.

The second DCI may be detected by performing blind detection on data received from the base station according to a Cell Radio Network Temporary Identifier (C-RNTI). When the second DCI is detected, it may be determined that the second DCI is received. When the second DCI is not detected, it may be determined that the second DCI is not received.

In an embodiment, first UE may perform blind detection on data received from a base station according to a Cell Radio Network Temporary Identifier (C-RNTI), to determine first DCI and second DCI sent by the base station corresponding to the first UE.

Figure 5:
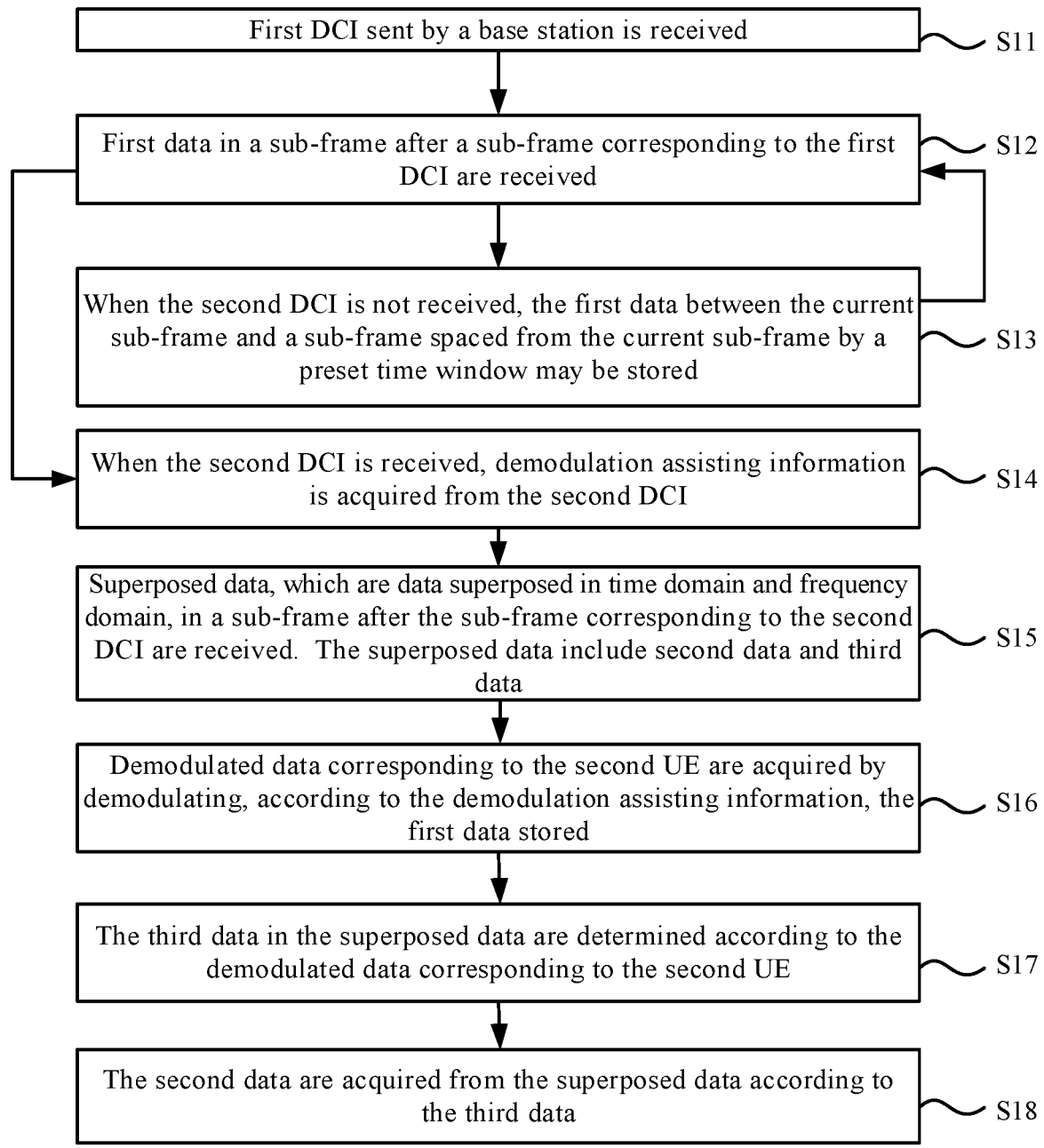
FIG. 5 is a flowchart of a method for receiving data according to an embodiment of the subject disclosure.

FIG. 5 is a flowchart of a method for receiving data according to an embodiment of the subject disclosure. As shown in FIG. 5, based on the embodiment shown in FIG. 1, the first UE may store the first data between the current sub-frame and the sub-frame corresponding to the first DCI as follows.

In S131, the first data between the current sub-frame and a sub-frame spaced from the current sub-frame by a preset time window may be stored.

In an embodiment, after receiving first data and before receiving second DCI, first UE may store the first data between the current sub-frame and a sub-frame spaced from the current sub-frame by a preset time window. A preset time window may be set as needed. For example, a preset time window may be set to be no longer than a number of sub-frames between the current sub-frame and the sub-frame corresponding to the first DCI.

Optionally, the first UE may acquire demodulated data corresponding to the second UE by demodulating, according to the demodulation assisting information, the first data stored as follows.

Demodulated data corresponding to the second UE may be acquired by demodulating, according to the demodulation assisting information, the first data stored and the superposed data.

In an embodiment, the first data stored and the superposed data may be merged in terms of power. Merged data may be demodulated according to the demodulation assisting information. Power of merged data of the first data stored and the superposed data is greater than power of merged data of the first data stored, improving a rate of success in acquiring demodulated data corresponding to the second UE by demodulation.

FIG. 6 is a flowchart of a method for sending data according to an embodiment of the subject disclosure. The method of the embodiment may apply to a base station, such as a 4th-Generation (4G) base station, a 5th-Generation (5G) base station, etc. As shown in FIG. 5, the method for sending data may include a step as follows.

In S61, first Downlink Control Information (DCI), first data in a sub-frame after a sub-frame corresponding to the first DCI, second DCI corresponding to the first UE, superposed data, which are data superposed in time domain and frequency domain, in a sub-frame after a sub-frame corresponding to the second DCI, etc., are sent to first User Equipment (UE).

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and the base station is greater than a distance between the first UE and the base station.

In an embodiment, in addition to sending DCI and data in a solution shown in FIG. 2, a base station may also send first DCI. After receiving the first DCI, first UE may receive data corresponding to second UE in a sub-frame after a sub-frame corresponding to the first DCI according to information such as a sub-frame corresponding to data corresponding to the second UE in time domain, etc., as indicated by the first DCI, as well as a location in the time domain and a duration of a Downlink (DL) gap as indicated by a system message.

First UE may receive and store data corresponding to second UE before a sub-frame corresponding to second DCI. Accordingly, when the first UE has received superposed data of data corresponding to the first UE and the data corresponding to the second UE in time domain and frequency domain, the first UE may determine demodulated data corresponding to the second UE by demodulating stored data corresponding to the second UE. The first UE may determine modulated data corresponding to the second UE in superposed data according to the demodulated data corresponding to the second UE. Accordingly, the first UE may acquire the demodulated data corresponding to the second UE without having to first receive a large amount of superposed data after the sub-frame corresponding to the second DCI. Thus, the first UE may rapidly acquire the data corresponding to the first UE from the superposed data upon receiving the second DCI, greatly reducing a delay in acquiring, by the first UE, the data corresponding to the first UE from the superposed data.

FIG. 7 is a flowchart of a method for sending data according to an embodiment of the subject disclosure. As shown in FIG. 7, based on the embodiment shown in FIG. 6, the first DCI may be sent to the first UE as follows.

In S611, the first DCI may be sent to the first UE through first control signaling. The first control signaling may include but the first DCI.

In an embodiment, first DCI may be sent to first UE through first control signaling including only the first DCI. Accordingly, the first UE is not required to parse signaling including multiple pieces of control information in order to acquire the first control signaling, facilitating acquiring, by the first UE, the first control signaling.

FIG. 8 is a flowchart of a method for sending data according to an embodiment of the subject disclosure. As shown in FIG. 8, based on the embodiment shown in FIG. 6, the first DCI may be sent to the first UE as follows.

In S612, the first DCI may be sent to the first UE through second control signaling. The second control signaling may include the first DCI and other control information.

In an embodiment, first DCI may be sent to first UE through second control signaling including other control information. Accordingly, no additional control signaling may have to be sent to UE, facilitating reducing data volume of signaling sent by a base station.

Corresponding respectively to embodiments of the method for receiving data and the method for sending data, the subject disclosure also proposes embodiments of a device for receiving data and a device for sending data.

Figure 9:
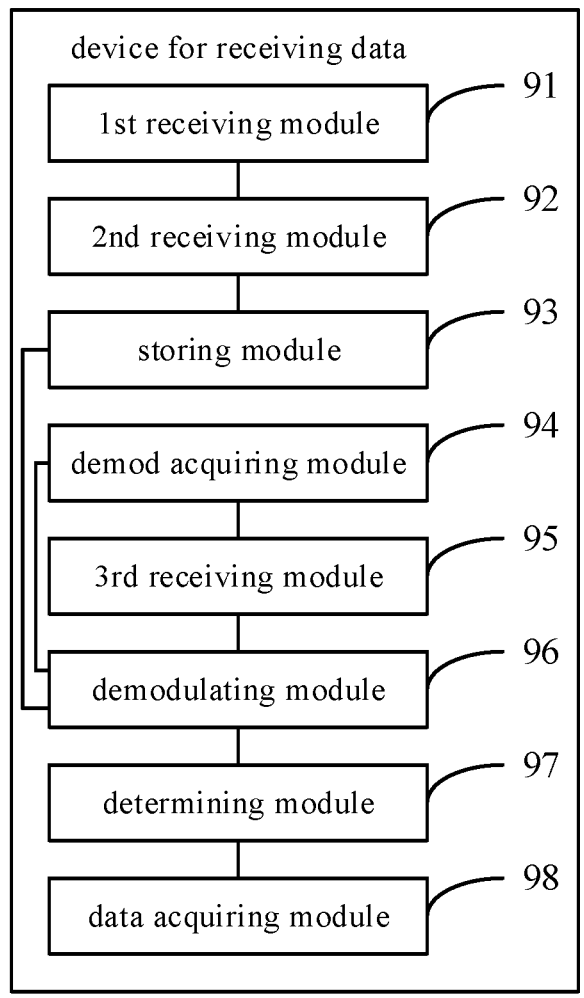
FIG. 9 is a block diagram of a device for receiving data according to an embodiment of the subject disclosure.

FIG. 9 is a block diagram of a device for receiving data according to an embodiment of the subject disclosure. The device of the embodiment may apply to first UE, such as a mobile phone, a tablet computer, etc. As shown in FIG. 9, the device includes a first receiving module, a second receiving module, a storing module, a demodulation acquiring module, a third receiving module, a demodulating module, a determining module, and a data acquiring module.

The first receiving module 91 is adapted to receiving first Downlink Control Information (DCI) sent by a base station.

The second receiving module 92 is adapted to receiving first data in a sub-frame after a sub-frame corresponding to the first DCI. The first data are modulated data corresponding to second UE in any sub-frame between the sub-frame corresponding to the first DCI and a sub-frame corresponding to second DCI corresponding to the first UE. A distance between the second UE and the base station is greater than a distance between the first UE and the base station.

The storing module 93 is adapted to, in response to determining that the second DCI is not received, storing the first data between a current sub-frame and the sub-frame corresponding to the first DCI. The current sub-frame is a sub-frame when it is determined whether the second DCI is received.

The demodulation acquiring module 94 is adapted to, in response to determining that the second DCI is received, acquiring demodulation assisting information from the second DCI.

The third receiving module 95 is adapted to receiving superposed data, which are data superposed in time domain and frequency domain, in a sub-frame after the sub-frame corresponding to the second DCI. The superposed data include second data and third data. The second data are modulated data corresponding to the first UE. The third data are modulated data corresponding to the second UE after the sub-frame corresponding to the second DCI.

The demodulating module 96 is adapted to acquiring demodulated data corresponding to the second UE by demodulating, according to the demodulation assisting information, the first data stored.

The determining module 97 is adapted to determining the third data in the superposed data according to the demodulated data corresponding to the second UE.

The data acquiring module 98 is adapted to acquiring the second data from the superposed data according to the third data.

Figure 10:
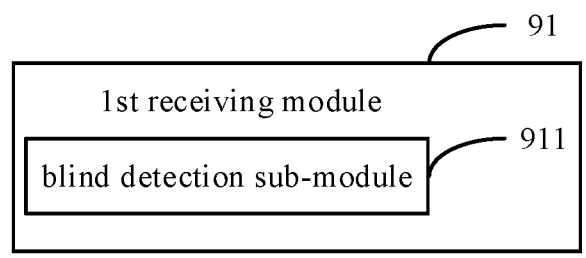
FIG. 10 is a block diagram of a first receiving module according to an embodiment of the subject disclosure.

FIG. 10 is a block diagram of a first receiving module according to an embodiment of the subject disclosure. As shown in FIG. 10, based on the embodiment shown in FIG. 9, the first receiving module 91 may include a blind detection sub-module.

The blind detection sub-module 911 may be adapted to detecting the first DCI by performing blind detection on data received from the base station according to a Cell Radio Network Temporary Identifier (C-RNTI).

Figure 11:
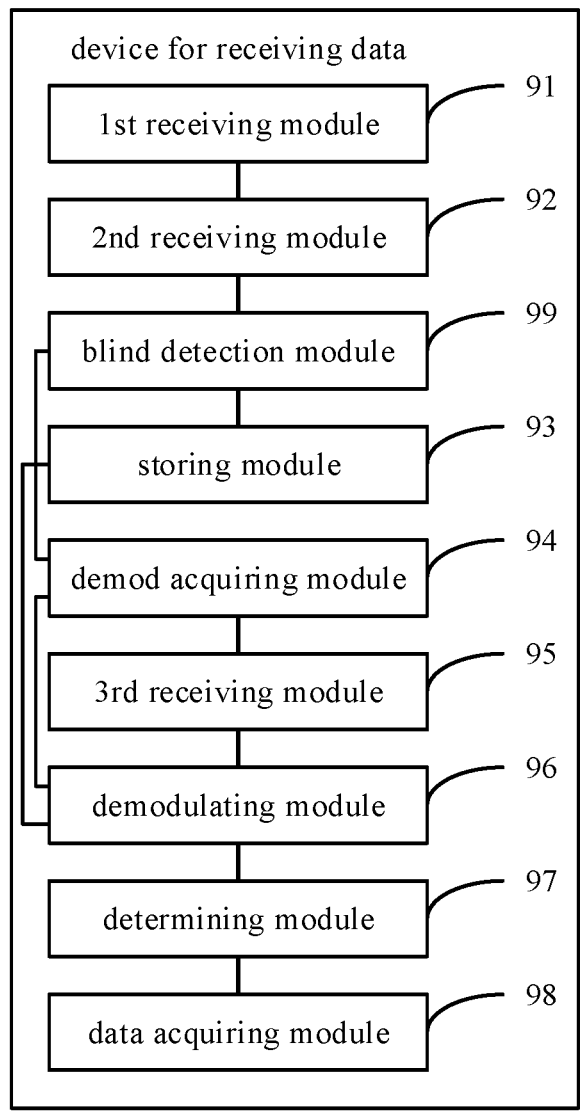
FIG. 11 is a block diagram of a device for receiving data according to an embodiment of the subject disclosure.

FIG. 11 is a block diagram of a device for receiving data according to an embodiment of the subject disclosure. As shown in FIG. 11, based on the embodiment shown in FIG. 9, the device may further include a blind detection module.

The blind detection module 99 may be adapted to: detecting the second DCI by performing blind detection on data received from the base station according to a Cell Radio Network Temporary Identifier (C-RNTI); in response to determining that the second DCI is detected, determining that the second DCI is received; in response to determining that the second DCI is not detected, determining that the second DCI is not received.

Optionally, the storing module may be adapted to storing the first data between the current sub-frame and a sub-frame spaced from the current sub-frame by a preset time window.

Figure 12:
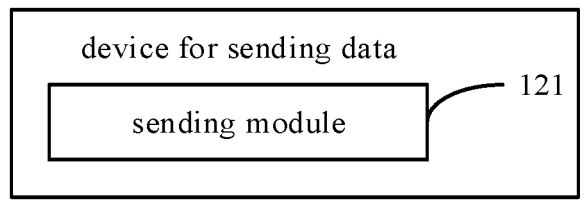
FIG. 12 is a block diagram of a device for sending data according to an embodiment of the subject disclosure.

FIG. 12 is a block diagram of a device for sending data according to an embodiment of the subject disclosure. The device of the embodiment may apply to a base station, such as a 4G base station, a 5G base station, etc. As shown in FIG. 12, the device for sending data includes a sending module.

The sending module 121 is adapted to sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and a base station is greater than a distance between the first UE and the base station.

Optionally, the sending module may be adapted to sending the first DCI to the first UE through first control signaling. The first control signaling may include but the first DCI.

Optionally, the sending module may be adapted to sending the first DCI to the first UE through second control signaling. The second control signaling may include the first DCI and other control information.

A module of the device according to at least one embodiment herein may execute an operation in a mode elaborated in at least one embodiment of the method herein, which will not be repeated here.

A device embodiment herein basically corresponds to a method embodiment herein, description of which may be referred to for a related part thereof. A device embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above without creative effort.

According to an embodiment of the subject disclosure, electronic equipment may apply to first User Equipment (UE). The electronic equipment includes a processor and memory.

The memory is adapted to storing an instruction executable by the processor.

The processor is adapted to:

receiving first Downlink Control Information (DCI) sent by a base station;

receiving first data in a sub-frame after a sub-frame corresponding to the first DCI, the first data being modulated data corresponding to second UE in any sub-frame between the sub-frame corresponding to the first DCI and a sub-frame corresponding to second DCI corresponding to the first UE, a distance between the second UE and the base station being greater than a distance between the first UE and the base station;

in response to determining that the second DCI is not received, storing the first data between a current sub-frame and the sub-frame corresponding to the first DCI, the current sub-frame being a sub-frame when it is determined whether the second DCI is received;

in response to determining that the second DCI is received, acquiring demodulation assisting information from the second DCI;

receiving superposed data, which are data superposed in time domain and frequency domain, in a sub-frame after the sub-frame corresponding to the second DCI, the superposed data comprising second data and third data, the second data being modulated data corresponding to the first UE, the third data being modulated data corresponding to the second UE after the sub-frame corresponding to the second DCI;

acquiring demodulated data corresponding to the second UE by demodulating, according to the demodulation assisting information, the first data stored;

determining the third data in the superposed data according to the demodulated data corresponding to the second UE; and acquiring the second data from the superposed data according to the third data.

According to an embodiment of the subject disclosure, a computer-readable storage medium has stored thereon a computer program applying to first User Equipment (UE). When executed by a processor, the computer program causes the processor to implement:

receiving first Downlink Control Information (DCI) sent by a base station;

receiving first data in a sub-frame after a sub-frame corresponding to the first DCI, the first data being modulated data corresponding to second UE in any sub-frame between the sub-frame corresponding to the first DCI and a sub-frame corresponding to second DCI corresponding to the first UE, a distance between the second UE and the base station being greater than a distance between the first UE and the base station;

in response to determining that the second DCI is not received, storing the first data between a current sub-frame and the sub-frame corresponding to the first DCI, the current sub-frame being a sub-frame when it is determined whether the second DCI is received;

in response to determining that the second DCI is received, acquiring demodulation assisting information from the second DCI;

receiving superposed data, which are data superposed in time domain and frequency domain, in a sub-frame after the sub-frame corresponding to the second DCI, the superposed data comprising second data and third data, the second data being modulated data corresponding to the first UE, the third data being modulated data corresponding to the second UE after the sub-frame corresponding to the second DCI;

acquiring demodulated data corresponding to the second UE by demodulating, according to the demodulation assisting information, the first data stored;

determining the third data in the superposed data according to the demodulated data corresponding to the second UE; and acquiring the second data from the superposed data according to the third data.

According to an embodiment of the subject disclosure, electronic equipment includes a processor and memory.

The memory is adapted to storing an instruction executable by the processor.

The processor is adapted to sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and a base station is greater than a distance between the first UE and the base station.

According to an embodiment of the subject disclosure, a computer-readable storage medium has stored thereon a computer program. When executed by a processor, the computer program causes the processor to implement:

sending, to first User Equipment (UE), first Downlink Control Information (DCI), first data in a sub-frame after a sub-frame corresponding to the first DCI, second DCI corresponding to the first UE, and superposed data, which are data superposed in time domain and frequency domain, in a sub-frame after a sub-frame corresponding to the second DCI.

The first data are modulated data corresponding to second UE in any sub-frame between the sub-frame corresponding to the first DCI and the sub-frame corresponding to the second DCI corresponding to the first UE. The superposed data include second data and third data. The second data are modulated data corresponding to the first UE. The third data are modulated data corresponding to the second UE after the sub-frame corresponding to the second DCI. A distance between the second UE and a base station is greater than a distance between the first UE and the base station.

Figure 13:
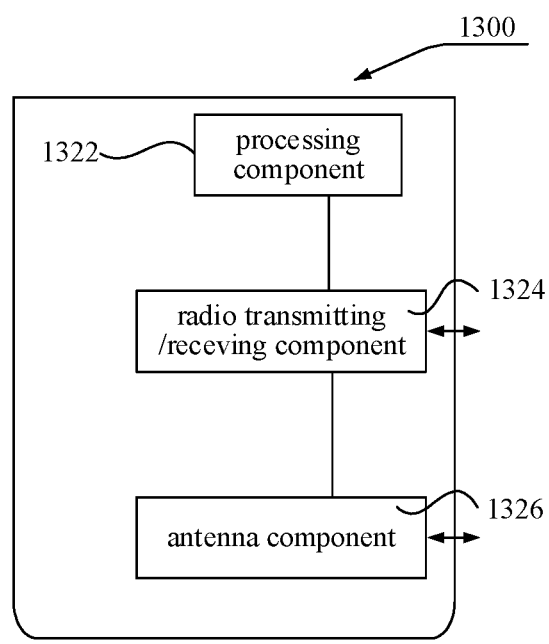
FIG. 13 is a block diagram of a device for sending data according to an exemplary embodiment.

FIG. 13 is a block diagram of a device 1300 for sending data according to an exemplary embodiment. As shown in FIG. 13, the device 1300 may be provided as a base station. Referring to FIG. 13, the device 1300 may include a processing component 1322, a radio transmitting/receiving component 1324, an antenna component 1326, and a signal processing part dedicated to a radio interface. The processing component 1322 may further include one or more processors. A processor of the processing component 1322 may be adapted to implementing the method for sending data according to any embodiment herein.

Figure 14:
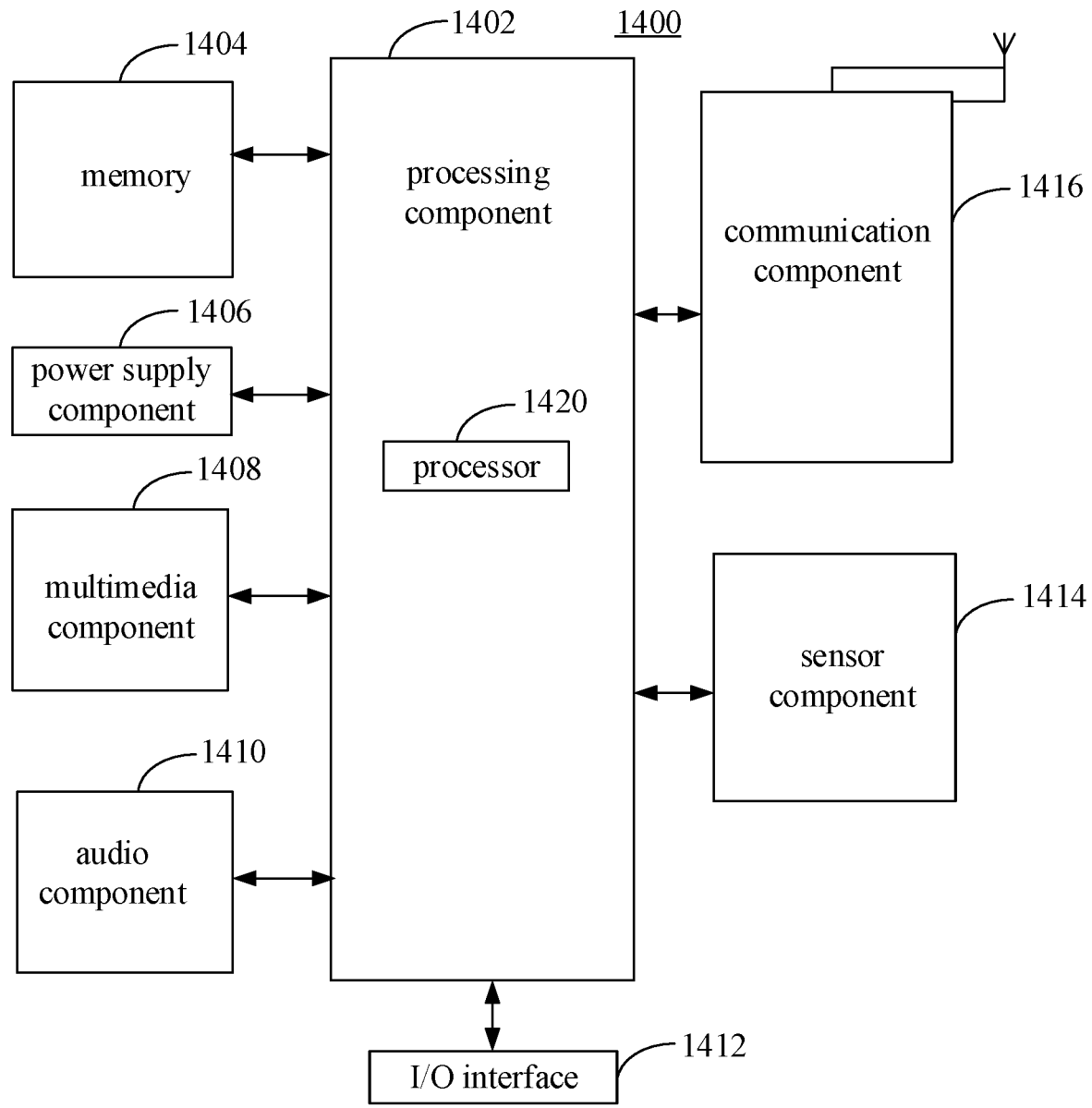
FIG. 14 is a block diagram of a device for receiving data according to an exemplary embodiment.

FIG. 14 is a block diagram of a device 1400 for receiving data according to an exemplary embodiment. For example, the device 1400 may be UE such as a mobile phone, a computer, digital broadcast UE, messaging equipment, a gaming console, tablet equipment, medical equipment, exercise equipment, a personal digital assistant, etc.

Referring to FIG. 14, the device 1400 may include at least one of a processing component 1402, memory 1404, a power supply component 1406, a multimedia component 1408, an audio component 1410, an Input/Output (I/O) interface 1412, a sensor component 1414, a communication component 1416, etc.

The processing component 1402 may generally control an overall operation of the device 1400, such as operations associated with display, a telephone call, data communication, a camera operation, a recording operation, etc. The processing component 1402 may include one or more processors 1420 to execute instructions so as to complete all or a part of an aforementioned method. In addition, the processing component 1402 may include one or more modules to facilitate interaction between the processing component 1402 and other components. For example, the processing component 1402 may include a multimedia portion to facilitate interaction between the multimedia component 1408 and the processing component 1402.

The memory 1404 may be adapted to storing various types of data to support the operation at the device 1400. Examples of such data may include instructions of any application or method adapted to operating on the device 1400, contact data, phonebook data, messages, pictures, videos, etc. The memory 1404 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1406 may supply electric power to various components of the device 1400. The power supply component 1406 may include a power management system, one or more power sources, and other components related to generating, managing, and distributing electricity for the device 1400.

The multimedia component 1408 may include a screen that provides an output interface between the device 1400 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1408 may include at least one of a front camera or a rear camera. When the device 1400 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1410 may be adapted to outputting and/or inputting an audio signal. For example, the audio component 1410 may include a microphone (MIC). When the device 1400 is in an operation mode such as a call mode, a recording mode, a voice recognition mode, etc., the MIC may be adapted to receiving an external audio signal. The received audio signal may be further stored in the memory 1404 or may be sent via the communication component 1416. The audio component 1410 may further include a loudspeaker adapted to outputting the audio signal.

The I/O interface 1412 may provide an interface between the processing component 1402 and a peripheral interface portion. Such a peripheral interface portion may be a keypad, a click wheel, a button, etc. Such a button may include but is not limited to at least one of a homepage button, a volume button, a start button, or a lock button.

The sensor component 1414 may include one or more sensors for assessing various states of the device 1400. For example, the sensor component 1414 may detect an on/off state of the device 1400 and relative positioning of components such as the display and the keypad of the device 1400. The sensor component 1414 may further detect a change in the position of the device 1400 or of a component of the device 1400, whether there is contact between the device 1400 and a user, the orientation or acceleration/deceleration of the device 1400, a change in the temperature of the device 1400, etc. The sensor component 1414 may include a proximity sensor adapted to detecting existence of a nearby object without physical contact. The sensor component 1414 may further include an optical sensor such as a Complementary Metal-Oxide-Semiconductor (CMOS) or a Charge-Coupled-Device (CCD) image sensor used in an imaging application. The sensor component 1414 may further include an acceleration sensor, a gyroscope sensor, a magnetic sensor, a pressure sensor, a temperature sensor, etc.

The communication component 1416 may be adapted to facilitating wired or wireless communication between the device 1400 and other equipment. The device 1400 may access a wireless network based on a communication standard such as Wi-Fi, 2G, 3G . . . , or a combination thereof. The communication component 1416 may broadcast related information or receive a broadcast signal from an external broadcast management system via a broadcast channel. The communication component 1416 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the device 1400 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method for receiving data of any embodiment herein.

In an exemplary embodiment, a non-transitory computer-readable storage medium including instructions, such as memory 1404 including instructions, may be provided. The instructions may be executed by the processor 1420 of the device 1400 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

Note that herein, a relation term such as "first," "second," etc., is used merely to differentiate one entity or operation from another without necessarily requiring or implying existence of such an actual relation or order between such entities. A term such as "including/comprising," "containing," or any other variant thereof is intended to cover a non-exclusive inclusion, such that a process, method, article, or equipment including a series of elements not only includes the elements, but also includes the other element(s) not explicitly listed, or the element(s) inherent to such a process, method, article, or equipment. Given no more limitation, an element defined by a phrase "including a . . . " does not exclude existence of another identical element in a process, method, article, or device that includes the element.

Elaborated above are the method and device according to embodiments herein. The principle and the mode of implementation herein are illustrated with reference to specific examples. The embodiments are described merely to facilitate understanding of the method herein and the core concept thereof. A person having ordinary skill in the art may change a range or mode of the implementation according to the concept herein. Content herein shall not be taken as limiting the subject disclosure.

The invention claimed is:

1. A method for receiving data, applying to first User Equipment (UE), the method comprising:
   receiving first Downlink Control Information (DCI) sent by a base station;
   after receiving the first DCI, receiving first data;
   in response to not receiving second DCI, storing the first data;
   in response to receiving the second DCI, acquiring demodulation assisting information from the second DCI;
   after receiving the second DCI, receiving superposed data, the superposed data comprising second data and third data superposed in time domain and frequency domain, the second data being modulated data corresponding to the first UE, the third data being modulated data corresponding to second UE;
   acquiring demodulated data corresponding to the second UE by demodulating stored first data according to the demodulation assisting information, the stored first data being data received after receiving the first DCI before receiving the second DCI, the stored first data comprising the modulated data corresponding to the second UE;
   determining the third data in the superposed data according to the demodulated data corresponding to the second UE; and
   acquiring the second data from the superposed data according to the third data.

2. The method of claim 1, wherein a distance between the second UE and the base station is greater than a distance between the first UE and the base station.

3. The method of claim 1, wherein said receiving the first DCI sent by the base station comprises:
   detecting the first DCI by performing blind detection on data received from the base station according to a Cell Radio Network Temporary Identifier (C-RNTI).

4. The method of claim 1, further comprising determining whether the second DCI is received by
   detecting the second DCI by performing blind detection on data received from the base station according to a Cell Radio Network Temporary Identifier (C-RNTI); in response to the second DCI being detected, determining that the second DCI is received; in response to the second DCI not being detected, determining that the second DCI is not received.

5. The method of claim 1, wherein said storing the first data comprises:
   storing the first data between a current sub-frame and a sub-frame spaced from the current sub-frame by a preset time window.

6. The method of claim 2, wherein said storing the first data comprises:
   storing the first data between a current sub-frame and a sub-frame spaced from the current sub-frame by a preset time window.

7. The method of claim 3, wherein said storing the first data comprises:
   storing the first data between a current sub-frame and a sub-frame spaced from the current sub-frame by a preset time window.

8. The method of claim 4, wherein said storing the first data comprises:

storing the first data between a current sub-frame and a sub-frame spaced from the current sub-frame by a preset time window.

9. A communication system implementing the method of claim 1, comprising the first UE, wherein the first UE is configured to implement:
receiving first Downlink Control Information (DCI) sent by a base station;
after receiving the first DCI, receiving first data;
in response to not receiving second DCI, storing the first data;
in response to receiving the second DCI, acquiring demodulation assisting information from the second DCI;
after receiving the second DCI, receiving superposed data, the superposed data comprising second data and third data superposed in time domain and frequency domain, the second data being modulated data corresponding to the first UE, the third data being modulated data corresponding to second UE;
acquiring demodulated data corresponding to the second UE by demodulating stored first data according to the demodulation assisting information, the stored first data being data received after receiving the first DCI before receiving the second DCI, the stored first data comprising the modulated data corresponding to the second UE;
determining the third data in the superposed data according to the demodulated data corresponding to the second UE; and
acquiring the second data from the superposed data according to the third data.

10. The communication system of claim 9, further comprising the base station, wherein the base station is configured to perform:
sending, to the first UE, the first DCI;
after sending the first DCI to the first UE, sending the first data to the first UE, the first data comprising the modulated data corresponding to the second UE;
after sending the first data, sending, to the first UE, the second DCI comprising the demodulation assisting information, the demodulation assisting information being configured for acquiring the demodulated data corresponding to the second UE by demodulating the first data; and
after sending the second DCI, sending the superposed data to the first UE.

11. The communication system of claim 9, wherein a distance between the second UE and the base station is greater than a distance between the first UE and the base station.

12. A method for sending data, comprising:
sending, to first User Equipment (UE), first Downlink Control Information (DCI);
after sending the first DCI to the first UE, sending first data to the first UE, the first data comprising modulated data corresponding to second UE;
after sending the first data, sending, to the first UE, second DCI comprising demodulation assisting information, the demodulation assisting information being configured for acquiring demodulated data corresponding to the second UE by demodulating the first data; and
after sending the second DCI, sending superposed data to the first UE, the superposed data comprising second data and third data superposed in time domain and frequency domain, the second data being modulated data corresponding to the first UE, the third data being modulated data corresponding to the second UE.

13. The method of claim 12, wherein a distance between the second UE and the base station being greater than a distance between the first UE and the base station.

14. The method of claim 12, wherein said sending the first DCI to the first UE comprises:
sending the first DCI to the first UE through first control signaling, the first control signaling including but the first DCI.

15. The method of claim 12, wherein said sending the first DCI to the first UE comprises:
sending the first DCI to the first UE through second control signaling, the second control signaling comprising the first DCI and other control information.

16. First User Equipment (UE), comprising a processor and memory, wherein the memory is configured to store instructions executable by the processor, wherein the processor is configured, by executing the instructions stored in the memory, to perform:
receiving first Downlink Control Information (DCI) sent by a base station;
after receiving the first DCI, receiving first data;
in response to not receiving second DCI, storing the first data;
in response to receiving the second DCI, acquiring demodulation assisting information from the second DCI;
after receiving the second DCI, receiving superposed data, the superposed data comprising second data and third data superposed in time domain and frequency domain, the second data being modulated data corresponding to the first UE, the third data being modulated data corresponding to second UE;
acquiring demodulated data corresponding to the second UE by demodulating stored first data according to the demodulation assisting information, the stored first data being data received after receiving the first DCI before receiving the second DCI, the stored first data comprising the modulated data corresponding to the second UE;
determining the third data in the superposed data according to the demodulated data corresponding to the second UE; and
acquiring the second data from the superposed data according to the third data.

17. The first UE of claim 16, wherein a distance between the second UE and the base station is greater than a distance between the first UE and the base station.

18. The first UE of claim 16, wherein the processor is further configured to receive the first DCI sent by the base station by:
detecting the first DCI by performing blind detection on data received from the base station according to a Cell Radio Network Temporary Identifier (C-RNTI).

19. The first UE of claim 16, wherein the processor is further configured to determine whether the second DCI is received by
detecting the second DCI by performing blind detection on data received from the base station according to a Cell Radio Network Temporary Identifier (C-RNTI); in response to the second DCI being detected, determining that the second DCI is received; in response to the second DCI not being detected, determining that the second DCI is not received.

20. The first UE of claim 16, wherein the processor is further configured to store the first data by storing the first data between a current sub-frame and a sub-frame spaced from the current sub-frame by a preset time window.

\* \* \* \* \*